(12) United States Patent
Alles

(10) Patent No.: US 8,275,561 B2
(45) Date of Patent: Sep. 25, 2012

(54) POWER MONITORING AND ANALYSIS SYSTEM FOR IDENTIFYING INDIVIDUAL ELECTRICAL DEVICES

(75) Inventor: Harold Gene Alles, Lake Oswego, OR (US)

(73) Assignee: Home Comfort Zones, Inc., Portland, OR (US)

( * ) Notice: Subject to any disclaimer, the term of this patent is extended or adjusted under 35 U.S.C. 154(b) by 341 days.

(21) Appl. No.: 12/435,813

(22) Filed: May 5, 2009

(65) Prior Publication Data

US 2010/0287489 A1    Nov. 11, 2010

(51) Int. Cl.
*G01R 21/00* (2006.01)
(52) U.S. Cl. ............... 702/61; 702/60; 702/64; 702/66; 702/189
(58) Field of Classification Search .................... 702/60, 702/62, 65, 83, 66, 67, 189, 61; 706/54; 715/772
See application file for complete search history.

(56) References Cited

U.S. PATENT DOCUMENTS

| | | | |
|---|---|---|---|
| 5,289,362 A | 2/1994 | Liebl et al. | |
| 6,038,516 A * | 3/2000 | Alexander et al. | ............. 702/67 |
| 6,906,617 B1 | 6/2005 | Van der Meulen | |
| 7,174,260 B2 | 2/2007 | Tuff et al. | |
| 7,246,014 B2 | 7/2007 | Forth et al. | |
| 2010/0191487 A1 * | 7/2010 | Rada et al. | ...................... 702/60 |

OTHER PUBLICATIONS

Albert, "Disaggregation: Brief Survey, Stanford University, Disaggregation: a Survey", (2010), Whole Document.

Armel, "Energy Eisaggregation, Precourt Energy Efficiency Center, Stanford University, May 2010", 11 pgs.
Cox, et al., "Transient Event Detection for Nonintrusive Load Monitoring and Demand Side Management Using Voltage Distortion, IEEE, 2006", 1751-1757.
Cox, et al., "Using the Non-Intrusive Load Monitor for Shipboard Supervisory Control, IEEE, 2007", 523-530.
Froehlich, et al., "HydroSense: Infrastructure-Mediated Single-Point Sensing of Whole-Home Water Activity, UbiComp 2009, Sep. 30-Oct. 3, 2009, Orlando Florida, USA", Whole Document.
Hart, G., "Nonintrusive Appliance Load Monitoring, Proceedings of the IEEE, vol. 80, No. 12, 1992", 1870-1891.
Laughman, et al., "Advanced Nonintrusive Monitoring of Electric Loads, IEEE Power and Energy, Mar. 2003", 56-63.
Lee, "Estimation of Variable-Speed-Drive Power Consumption From Harmonic Content, IEEE Transactions on Energy Conversion, vol. 20, No. 3, Sep. 2005", 566-574.
Lee, "Exploration on Load Signatures. International Conference on Electrical Engineering (ICEE) 2004, Japan", 1-5.
Leeb, et al., "Transient Event Detection in Spectral Envelope Estimates for Nonintrusive Load Monitoring, IEEE Transactions", 1200-1210.

(Continued)

*Primary Examiner* — Mohamed Charioui
*Assistant Examiner* — Paul D Lee
(74) *Attorney, Agent, or Firm* — Marger Johnson & McCollom, P.C.

(57) ABSTRACT

Techniques and mechanisms for evaluating a plurality of electrical devices variously powered by a common alternating current service. In an embodiment, a set of transition reports are processed to determine a cluster of transition reports including on-transition reports for an electrical device. In another embodiment, a data structure is created based on such an identified cluster, the data structure characterizing a first device of the plurality of electrical devices. The data structure is provided in one embodiment for an automatic determining of whether a first transition report subsequent to the set of transition reports corresponds to the first device.

14 Claims, 7 Drawing Sheets

OTHER PUBLICATIONS

Marceau, et al., "Nonintrasive load disaggregation computer program to estimate the energy consumption of major end uses for residential buildings, Energy Conversion & Management 41 (200013189-1403", 1389-1403.

Najmeddine, et al., "State of art on load monitoring methods, 2nd IEEE International Conference on Power and Energy (PECon 08), Dec. 1-3, 2008, Johor Baharu, Malaysia", 1256-1258.

Nakano, et al., "Non-Intrusive Electric Appliances Load Monitoring System Using Harmonic Pattern Recognition—Trail Aplication to Commercial Building, http://www.icee-con.org/papers/2007/Oral_Poster%20Papers/07/ICEE-333.PDF, website last accessed Apr. 19, 2012", 5 pgs., (2007).

Patel, et al., "At the Flick of a Switch: Detecting and Classifying Unique Electrical Events on the Residential Power Line, UbiComp 2007,LNCS 4717", (2007), 271-288.

Roos, et al., "Using Neural Networks for Non-intrusive Monitoring of Industrial Electrical Loads, IEEE 1994, IMTC May 10-12, 1994, Hamamatsu", (May 1994), 1115-1118.

Shrimali, "Gap Analysis, Visiting Scholar, Stanford University, Disaggregation Workshop, Session 4", (2010) Whole document.

Sultanem, "Using Appliance Signatures, IEEE Transactions on Power Delivery, vol. 6. No. 4, Oct. 1991", 1380-1385.

Venrock, "Disaggregation: One VC's View, May 28, 2010", 10 pgs.

* cited by examiner

START DATE 4/20/2009  START TIME  12:00:00AM

END DATE  PRESENT  END TIME  7:12:14PM

TOTAL POWER (KWH) 1052.10  TOTAL $  $105.21

PRESENT RATE (W)  6353  $/HR  $0.635

IDENTIFY  GROUP  RATES

| DEVICE | ON/OFF | POWER (W) | $/HR | TOTAL TIME | TOTAL $ |
|---|---|---|---|---|---|
| UNKNOWN | | 360 | $0.036 | 15:19:12:14 | $55.12 |
| A/C | | 4952 | $0.495 | 28:42:30 | $14.21 |
| CLOTHS DRYER | | 3134 | $0.313 | 8:17:29 | $ 2.60 |
| OVEN | | 3099 | $0.310 | 0:46:13 | $ 0.24 |
| DEVICE #2 | | 1469 | $0.147 | 2:12:44 | $ 0.32 |
| COMPUTER | | 243 | $0.024 | 71:22:28 | $17.34 |
| DEVICE #5 | | 225 | $0.025 | 13:52:16 | $ 3.12 |
| KITCHEN LIGHTS | | 193 | $0.019 | 42:10:20 | $ 0.81 |
| FAMILY RM LIGHTS | | 170 | $0.017 | 63:33:31 | $ 1.08 |
| 60 WATT LIGHTS (2) | | 120 | $0.012 | 19:05:45 | $ 0.23 |

GO TO NEXT PAGE

FIG. 5

POWER MONITORING AND ANALYSIS SYSTEM FOR IDENTIFYING INDIVIDUAL ELECTRICAL DEVICES

BACKGROUND OF THE INVENTION

1. Technical Field of the Invention

This invention relates generally to energy monitoring systems and more specifically to electrical power monitors as used in residential energy management systems.

2. Background Art

There is a broad growing interest in energy conservation. Reducing residential electrical consumption is a priority for national, state, and local governments, for utilities, and for consumers. It is especially important to reduce electrical consumption during peak load periods, typically in the afternoon on hot days. It is generally accepted that consumers are more likely to change their behavior if they are made aware of where, when, and how they use electricity in their household and how much it costs. A power monitoring system provides this information.

The simplest monitor displays the present rate of power use. Its function is similar to the power meter used by the utility company for billing, but it displays the information in a format and location that this more convenient for consumers. The power can be displayed in units of electricity (kilowatts) or in units of cost ($x.xx per hour). The display can be portable or located in a convenient place in the home. This type of monitor can make the consumer aware of the total cost of the electricity used by the household at the present time, and the power can be accumulated to show the total power used during a period of time and its cost. U.S. Pat. No. 7,174,260 issued Feb. 6, 2007 to Tuff, et al. describes such power monitor. It uses an optical sensor to monitor the power meter wheel as it turns and processes this information into rate of power use and cost. This information is wirelessly sent to a display device located in the residence. The device also accumulates the total power used during a period of time and its cost.

Other monitors extract information about the status of an electrical device by analyzing the amount of power used as a function of time. A power measuring device is used for each monitored electrical device and the power measurements are communicated to a central processor. Analysis of the changes in power use can determine the status of the device which is then displayed. U.S. Pat. No. 6,906,617 issued Jun. 14, 2005 to Van der Meulen describes such a system. The disadvantage of this approach is that a separate complex power monitor is used for each electrical device.

More sophisticate monitoring systems record the energy used over a period of time and processes and/or displays the information to make it more useful to the consumer. For example a graph of power use versus time can show the consumer how power use varies with household activity. As another example, the consumer might specify a start time and an end time, and the monitor might respond with the cost of power used during this period. U.S. Pat. No. 7,246,014 issued Jul. 17, 2007 to Forth, et al. describes such a system and describes several ways to display the information.

An increasing number of utilities are charging different rates for power depending on the time of day, day of week, or based on the total electricity used during the billing period. Some monitoring systems integrate this information with the measured power to provide the consumer more accurate and useful information that might encourage them to reduce energy consumption and/or change when they use power. For example, they might chose to reduce the amount of air conditioning used when electricity is expensive and to run their pool pump or do laundry at times when electricity is less expensive. U.S. Pat. No. 5,289,362 issued Feb. 22, 1994 to Liebl, et al. describes a system where a variation in the cost of electricity alters the settings for HVAC equipment.

While knowing the power and total power used by a household has value, there is more value in knowing the power and total power used by individual electrical devices. This information enables the consumer to make informed decisions about altering usage patterns and/or upgrading to new and/or higher efficiency devices. There exist power monitors that can be connected to an individual power circuits, individual outlets, and to individual devices. The disadvantage of this approach is an additional power sensor and a method of reporting its measurements are needed for each device monitored.

What is missing in the prior art for power monitors is a practical and economical method of using a single central power monitor to provide detailed information about the power and total power used by multiple individual electrical devices.

OBJECTS OF THIS INVENTION

It is an objective of this invention to provide a method for using a single set of power sensors and data analysis to provide the power and total power used by each of multiple individual electrical devices supplied by a common alternating current service.

It is a further objective of this invention to provide a power monitoring system that is practical for residential retrofit and that is able to provide useful information to consumers about the power used by each of multiple electrical devices.

SUMMARY

The invention is a method for measuring and processing a plurality of electrical parameters of a common alternating current (AC) service that supplies multiple different electrical devices such that the power use and total power used by each of multiple devices is determined. Sensors provide high resolution signals corresponding to the current and voltage of the AC power supplied to the service panel typical of those used in residential construction. Analog-to-digital conversion and processing circuits produce multiple electrical parameters with 16- to 24-bit resolution at a sampling rate sufficient to characterize rapid transitions. The electrical parameters change rapidly when electrical devices transition between on and off. These transitions are detected, measured, characterized, and stored. The transition characterizations of multiple on-off cycles are grouped and analyzed to produce unique transition characterizations for each device or set of devices that are essentially electrically identical. Once a device has been characterized, the method can determine in real time when each known device is turned on or off. Therefore the method can report on present and historical power usage of each known device, or set of essentially identical known devices.

BRIEF DESCRIPTION OF THE DRAWINGS

The invention will be understood more fully from the detailed description given below and from the accompanying drawings of the preferred embodiments of the invention which, however, should not be taken to limit the invention to the specific embodiments described, but are for explanation and understanding only.

FIG. 5 is a typical energy display showing power use produced by Processor 122.

DETAILED DESCRIPTION

Figure 1:
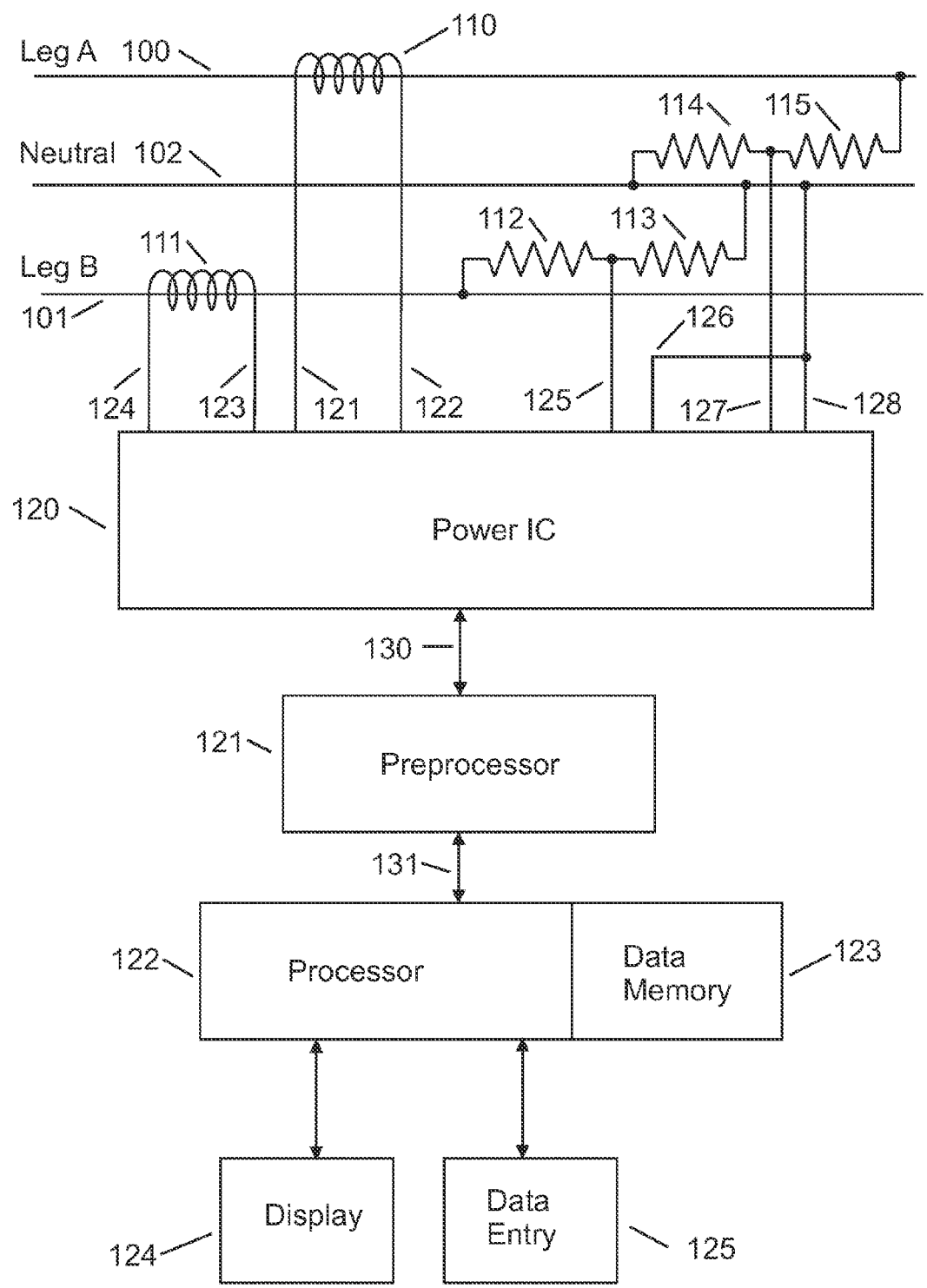
FIG. 1 is a block diagram of a circuit for sensing voltage and current and calculating the electrical parameters of a typical residential AC power service.

A typical household has dozens of different electrical devices that consume electrical power. Households typically have single examples of appliances such as HVAC equipment, washer, dryer, refrigerator, stove, microwave, toaster, coffeemaker, etc. Each of these devices has specific electrical behaviors when turning on, while running, and when turning off. It is very unlikely that the combination of these behaviors through a complete on-off cycle is identical for different devices. Even though the continuous power may be the nearly the same for the devices, differences in the on- and off-transitions will likely be sufficiently different to provide unique identification.

Households also may have multiple examples of identical devices such as lights. Even though a household might have many lights of exactly the same type, a different number of lights may be connected to different switches. So lights in one room might be distinguishable from lights in another room. Even if individual lights can not be distinguished, there is value in identifying the power used by a device category such as "60 watt lights", separating their use from other electrical devices.

Some electrical devices produce multiple transitions of different characteristics. For example, a washing machine will sequentially activate and deactivate multiple solenoids and motors during a full cycle. This sequence may be different for different setting options. Many other electrical devices such as microwaves and coffee makers produce multiple on and off-transition as heating elements are cycled to control the rate of heating and/or temperature. Analysis of a history of transitions covering many complete cycles can recognize and associate multiple different types of transitions with a single electrical device.

The identification of every electrical device in a household does not need to be complete, perfect, or fully automatic. It is most important that the devices using the largest amount of total power are identified. Devices such as air conditioners and electric ovens and stoves that use power at a high rate are the easiest to identify. However, devices that use power at a lower rate but operate for longer periods of time may consume more total power. Most households have multiple devices use power continuously at a low rate, and together may use significant total power. Dividing the devices into groups based just on rate of power usage, or based on total power used by the group provides the consumer with useful information that can help them save energy.

Accurately and consistently identifying electrical devices based on their operating characteristics requires accurate measurements and analysis that compensates for many imperfections in the electrical service to the household and its distribution within the residence. Variations in the supply voltage cause the power used by electrical devices to vary in different ways. For example, the power used by resistive devices such as incandescent lights and heaters changes approximately linearly with supply voltage. Other devices such as computers consume about the same power independent of the supply voltage, so the current increases as the supply voltage decreases. Some devices such as vacuum cleaners and shop tools use power at variable rates depending on how they are used.

The analysis must properly account for supply voltage variation when characterizing and recognizing electrical devices as they turn on and off. Likewise, external changes in supply voltage must be differentiated from household activity. For example, a step change in the supply voltage will likely cause a step change in the power used by the household. If only the power rate were monitored, this step change could not be distinguished from an electrical device turning on or off in the household. The analysis must determine if the change in measured power is consistent with the measured change in supply voltage, accounting for how the power use varies with supply voltage for each of the electrical devices that are presently on.

There is electrical resistance in wires that deliver power to a household. This means the supply voltage at the service panel will vary as the household power use changes. Likewise the supply voltage at a specific electrical device may vary as other electrical devices on the same circuit are turned on or off. These behaviors can cause uncertainty in the ability to reliably differentiate between electrical devices that have similar, yet distinct characteristics.

It may not be possible to uniquely identify all the electrical devices in a household. The percentage of the devices that can be identified depends on many factors including the accuracy and number of electrical parameters measured, the rate of measurement (sample rate), the number of complete operation cycles recorded for each electrical device, the data analysis, and the interfaces and interactions with the consumer. The preferred embodiment of the invention considers each of these factors to provide accurate identification at a reasonable cost. Those ordinarily skilled in the art can easily adapt the preferred embodiment and described methods to be more accurate for a higher cost, or less accurate for a lower cost, or reduce the cost of any embodiment as technology advances. This ability should not be construed as a limitation of the present invention.

FIG. 1 is a diagram showing the major components of the preferred embodiment. It is designed for a typical residential 3-wire, 240 volt single phase electrical service. Those ordinarily skilled in the art can easily adapt the preferred embodiment for other electrical services. Leg A 100 supplies 120 VAC (volts of alternating current) relative to the neutral supply 102. Leg B 101 also supplies 120 VAC relative the neutral supply 102, but the AC voltage is 180 degrees out of phase with Leg A, so there is 240 VAC between Leg A and Leg B.

The current sensor coils 110 and 111 and voltage sensor networks 112, 113, 114, and 115 are typically located in the service panel between the power meter and the circuit breakers connected to the wires that distribute the power throughout the household. The differential signals 121 and 122 produced by coil 110 are proportional to the AC current in Leg A and are suitable for input to Power IC 120. The differential signal 123 and 124 produced by coil 111 are proportional to the AC current in Leg B and are suitable for input to Power IC 120. Resistors 112 and 113 divide the voltage between Leg B and neutral 102 to produce the differential signal 125 and 126 suitable for input to the Power IC 120. Resistors 114 and 115 divide the voltage between Leg A and neutral 102 to produce the differential signal 127 and 128 suitable for input to the Power IC 120.

Power IC 120 is designed specifically for use in utility power meters. Several suitable commercial products are readily available. The preferred embodiment uses part number CS5467 provided by Cirrus Logic, Inc. (www.cirrus.com), 2901 Via Fortuna, Austin, Tex. 78746. Power IC 120 contains analog conditioning circuits and a 16-bit, 4-channel analog-to-digital converter for converting the sensed current and voltage signals into numerical values. It also contains digital processing circuits for providing various measures of power and characteristics of the voltage and current sensed in Leg A and Leg B. The sampling rate is about 4000 per second, or about 67 samples per cycle of 60 Hertz power.

Power IC 120 also has interface circuits that enable Preprocessor 121 to set configuration parameters in 120 and to read the values measured and computed by 120. Power IC 120 is configured to process the samples representing at least one complete AC cycle (67 samples) to produce the following electrical parameters for Leg A and for Leg B:
1) Peak Current
2) RMS Current
3) Peak Voltage
4) RMS Voltage
5) Active Power
6) Reactive Power
7) Power Factor Power IC 120 provides these electrical parameters as 24-bit quantities (3 bytes), ensuring that the 16-bit accuracy of the analog-to-digital conversion is carried throughout the calculations. Preprocessor 121 regularly reads these 14 electrical parameters (7 for each leg, a total of 42 bytes) for each processing period, or about 60 times per second. This ensures all transitions can be detected and characterized using information from each cycle of the AC supply.

Preprocessor 121 is single chip programmable processor with sufficient processing capacity to read the electrical parameters from Power IC 120, process and characterize the electrical parameters, and then prepare reports that transfer information to Processor 122. Several manufactures each provide several products that are suitable for this purpose. One example is model PIC24HJ128GP202 provided by Microchip Technology Inc. (www.microchip.com), 2355 West Chandler Blvd., Chandler, Ariz.

The data connection 130 between Power IC 120 and Preprocessor 121 is a high speed serial interface. Both circuits support a compatible protocol that operates at up to 1 Mb/s (million bits per second). Including overhead, it takes less than 1 millisecond to transfer the 42 bytes of data from Power IC 120 to Preprocessor 121

Preprocessor 121 communicates via data link 131 with Processor 122. This data link may be a wired connection using an industry standard such as USB or RS-232, or it may be wireless using a standard protocol such as 802.11. The preferred embodiment uses a wireless 802.11 data link.

Processor 122 may be a general purpose personal computer such as a laptop or a specialized processor used in a residential energy management system. Processor 122 includes a large data memory 123 used to store reports from Preprocessor 121. This nonvolatile memory may be solid-state flash memory such as used in digital cameras or disk memory. A 1 G (Gigabyte) memory has the capacity to store all the reports sent by Preprocessor 121 for a time period spanning several months.

Some embodiments may combine the functions of Preprocessor 121, data link 131, and Processor 122 into a single processor or single circuit. This can be easily accomplished by those ordinarily skilled in the art of circuit design and programming. This invention anticipates this combination of function. In addition, advances in technology or application requirements may enable and/or require additional and/or other combinations of functions. This invention also anticipates these other combination.

Processor 122 sequentially receives reports from Preprocessor 121 and stores them sequentially in the data memory 123. Transition reports contain transition parameters that characterize each rapid transition that occurs when any electrical device is turned on or off. The transition parameters are determined by processing the 14 electrical parameters for each AC cycle (~60 times per second) during the transition, and generating an on-transition report for each on-transition and an off-transition report for each off-transition.

In addition, a regular report is generated each second that contains the accumulated, average, or extreme values of the electrical parameters. The information in the regular reports is highly redundant, so Processor 122 may compress the regular reports before storage into data memory 123.

Processor 122 has a display 124 and a data entry device 125. The data entry device may be a standard keyboard, mouse, touch pad, or joy stick with buttons, or a touch screen associated with display 124. A consumer uses the data entry device to make requests for information about power use. Processor 122 responds by processing the reports contained in data memory 123 and generating a display of the information on display 124.

Figure 2:
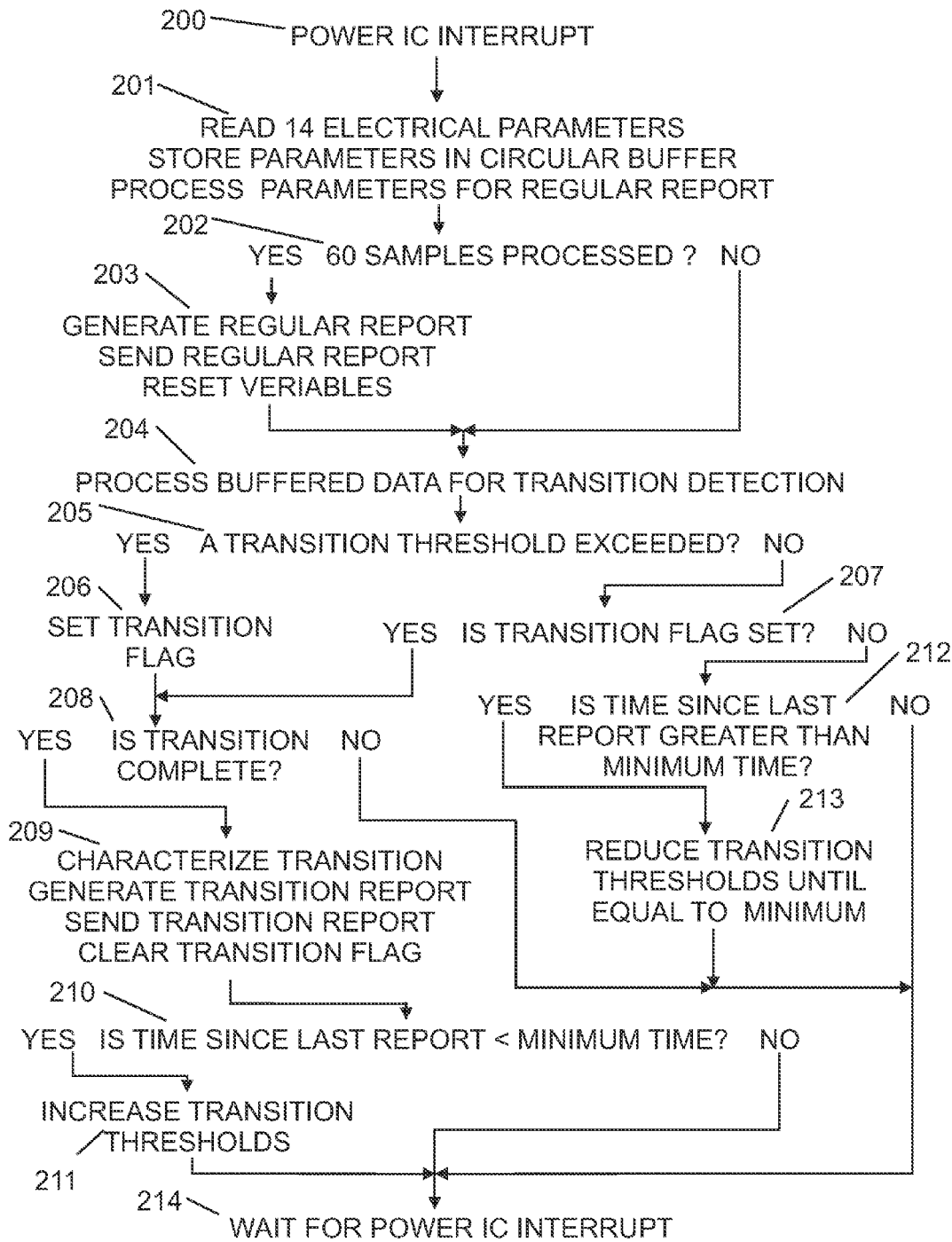
FIG. 2 is a flow diagram of operations performed by Preprocessor 121 to measure electrical and transition parameters and to prepare and send reports.

FIG. 2 is a flow diagram of the operations performed by Preprocessor 121. Power IC 120 is configured by Preprocessor 121 so that it generates an interrupt after it has accumulated samples for at least one complete AC cycle.

After Power IC 120 generates an interrupt 200, the Preprocessor 121 performs operations 201. The 14 electrical parameters previously described are read and stored in a circular buffer memory so that many recent samples can be processed to characterize a transition. In the preferred embodiment, 100 sets of electrical parameters are stored which requires approximately 4 k bytes of storage. The electrical parameters are processed to prepare for the regular report. The Active Power and Reactive Power are accumulated. The RMS Current, RMS Voltage, and Power Factor are averaged. The maximum values of Peak Current and Peak Voltage are retained.

Operations 202 track the number of electrical parameter sets processed and branches to perform operations 203 after 60 parameter sets have been received. The electrical parameter values are prepared and packed with a representation of the present date and time for sending to Processor 122. A variety of standard error detection methods and protocols can be used to ensure the data is accurately received by Processor 122. In the preferred embodiment, the 802.11 wireless protocol is used to communicate between Preprocessor 121 and Processor 122. Those ordinarily skilled in the art can adapted the invention for other communication methods and protocols. After sending the regular report, the variables used for preparing the regular report are reset to prepare for the operations that generate the next regular report.

Operations 204 process the buffered electrical parameters to determine the magnitude of change and rate of change of certain electrical parameters. The most effective indicator of an on-transition is a rapid increase in peak current and RMS current (unless correlated with an increase in voltage which indicates an external supply event). Likewise, the most effective indicator of an off-transition is a rapid decrease in peak current and RMS current (unless correlated with a decrease in voltage which indicates an external supply event). Current is typically more sensitive to transitions than active power since the current may be significantly out of phase with the voltage when a device is turning on or turning off.

The processing in 204 is differential so that the characterized transition produced by each device is independent of any combination of other devices that are also on. The first-difference between successive buffered samples represents the changes caused by devices currently on, variations in the supply, or by a device turning on or turning off. Typically the power used by the on devices is stable or changes relatively slowly. Exceptions are devices with "universal" motors (kitchen appliances, shop tools, etc) and compound devices like a washing machines which have solenoids and motors that produce transitions like independent devices.

The second-difference (the difference between successive first-difference samples) is sensitive to rapid changes that typically occur during the first few cycles after a device is turned on or turned off. For many devices, after the initial turn on surge, the second-difference changes relatively slowly until stable operation is reached within a few seconds or less.

The third-difference (the difference between successive second-difference samples) is useful in characterizing the relative complexity of on-transitions. For example, multiple changes in the sign of the third-difference samples indicate the transition includes oscillations.

Most devices are controlled by "rapid action" switches that are not synchronized to the phase of the AC supply so the measured change in current during the first cycle is highly variable. When first turned on, most devices draw current at a higher rate until they reach stable operating conditions. The operations in 204 select the largest absolute value of the first-difference of the peak current parameter for last three samples. The operations also select the largest second-difference of the RMS current for the last three samples.

Operations 205 compare the peak current changes and RMS current changes to the transition threshold for each. If either exceeds the threshold, then a significant transition is in process, and operation 206 sets the transition flag. If the threshold is not exceeded, then operation 207 tests if the transition flag is set. If either threshold is exceeded or if the transition flag is set, then operations 208 are executed. These operations are performed separately for each of the two legs of the AC supply.

Operations 208 determine if the transition is complete by processing the parameters stored in the circular buffer by operations 201. The second-differences of the active power and reactive power are tested for stability. The transition is considered complete when the sample-to-sample difference is less than 1% of the difference between the value before transition and the present value for both the active power and reactive power.

Operations 209 are performed after the transition is complete. The transition is characterized by the following 11 transition parameters:

1) Maximum change in peak current during the transition (relative to the value just before transition)
2) Maximum value of the second-differences of the RMS current beginning one sample after the cycle with the maximum change in peak current (transition parameter 1) until the end of the transition
3) Number of sign changes in the third-difference of RMS current during the transition
4) Time for the transition to complete
5) RMS current before the transition
6) RMS current after transition
7) RMS voltage before transition
8) RMS voltage after transition
9) Change in active power between before and after transition
10) Change in reactive power between before and after transition
11) Change in power factor between before and after transition These transition parameters are determined by processing the electrical parameters stored in the circular buffer by operations 201 associated with the power leg where the transition occurred. The transition report consists of these 11 transition parameters combined with a representation of the present date and time and a parameter specify Leg A or Leg B. On-transition reports intrinsically have a positive value for transition parameter 9), the change in active power. Off-transition reports intrinsically have a negative value for the change in active power. The sign of parameter 9) determines if the transition report characterizes an on-transition or an off-transition. The transition report is then sent to Processor 122.

A variety of standard error detection methods and protocols can be used to ensure the data is accurately received by Processor 122. In the preferred embodiment, the 802.11 wireless protocol is used to communicate between Preprocessor 121 and Processor 122.

Those ordinarily skilled in the art can adapted the invention for other communication methods and protocols.

After the transition report is sent, the transition flag is cleared to enable detection of a following transition. Transitions on each supply leg are processed separately, so two simultaneous separate transitions can be characterized if they occur on different legs. This will naturally happen for high-power devices such as air conditioners, clothes dryers, ovens, and water heaters that use 240 VAC. These simultaneous transitions make it particularly easy to identify these devices. Simultaneous transitions that occur on the same supply leg while its transition flag is set can not be accurately characterized, so they usually can not be assigned to a specific device.

Some electrical devices may rapidly produce regular or intermittent transitions that exceed the transition threshold, thereby generating many transition reports not associated with a device turning on or turning off. Operations 210 measure the time between transition reports, and increases the transition thresholds when the time between transition reports is less than a preset minimum such as 3 seconds. The thresholds are slowly increased by operations 211. Therefore a few nearly coincidental on-transitions or off-transitions do not significantly change the thresholds.

When operations 207 determine that the transition flag is not set, operations 212 are performed. If the time since the last transition report is greater than the minimum time, then operations 213 slowly decrease the thresholds until equal to the original preset minimum. If a device causes the thresholds to be increased, then operations 212 and 213 will return the thresholds to their original values after the device is turned off.

Operations 208, 210, 211, 212, and 213 have paths to operation 214 which simply waits until the next interrupt from the Power IC.

In summary, Preprocessor 121 configures Power IC 120 and reads 14 electrical parameters about 60 times per second. It generates and sends a regular report about once per second that characterizes the AC supply and the power used during the previous second. Preprocessor 121 also detects and characterizes transitions that occur when electrical devices are turned on or turned off, and generates and sends transition reports that include values for the 11 transition parameters.

Figure 3:
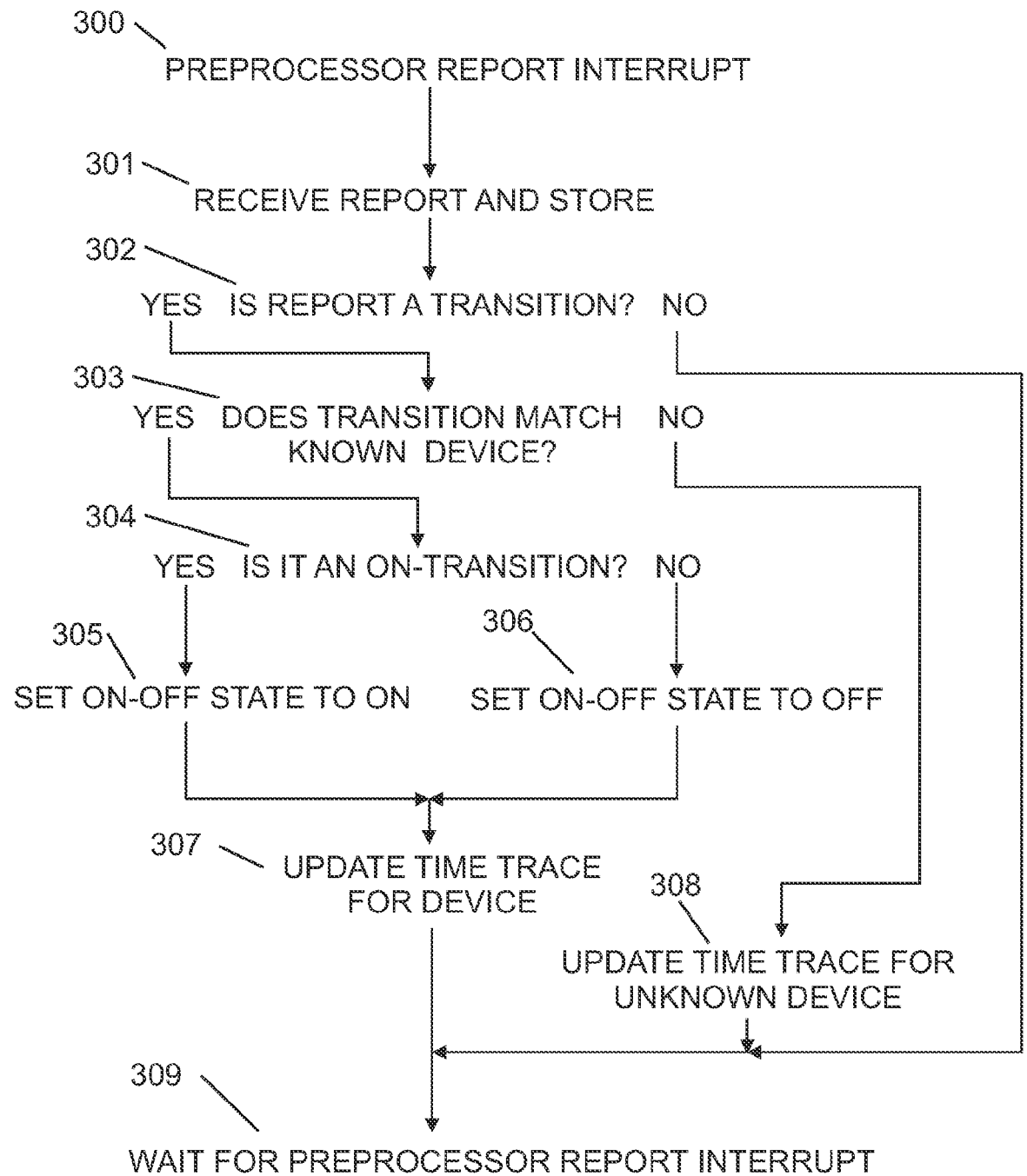
FIG. 3 is a flow diagram of the operations performed by Processor 122 to receive and store transition reports from the preprocessor.

FIG. 3 is a flow diagram of the operations preformed by Processor 122 as it receives, processes, and stores the reports from Preprocessor 121. These operations occur in "real time" and are continuous, and are therefore initiated by interrupt 300 caused by receiving a report from Preprocessor 121.

Operations 301 receive and verify the reports according to the communications protocol used in the data connection 131 between Preprocessor 121 and Processor 122. The reports are stored in the data memory 123 associated with Processor 122. This memory is used as a circular buffer so when it becomes full, it overwrites the oldest data.

Operations 302 determine if the report is a transition report, and performs operations 303 for transition reports. If the report is a regular report, then no further processing is necessary, so operations 309 are performed to prepare for the next interrupt and allows Processor 122 to do other unrelated function until the next interrupt occurs.

Operations 303 determine if the transition report matches a known device. Initially, there are no known devices. Known devices are characterized by the batch report processing described in the following. On-transitions are compared to the characteristics of known on-transitions and off-transitions are compared to the characteristics of known off-transitions. The first comparison is based on the change in active power, adjusted to the RSM voltage as determined by the batch processing described in the following. The transition characterizations of a known device includes the acceptable range of the change in active power associated with the known transition, as determined by the batch processing described in the following. The range is expressed and minimum and maximum value. The transition report is considered a match if its change in active power is within this range (between the minimum and maximum value). It is possible that more than one known device can be matched based the change in active power.

If an off-transition is matched to more than one known device, it may be that only one of the known devices is currently on, so the off-transition report can be uniquely associated with the device that is currently on.

If the transition report can not be uniquely associated with one of the known devices based on change in active power, three other comparison are made based on the following transition parameters:

1) Maximum change in the peak current
2) Maximum value of the second-difference of the RMS current
3) Time for the transition to complete If the values of these three transition parameters are within the ranges specified by the characterization parameters as determined by the batch processing described in the following, then the transition report can most likely be associated with a unique known device.

If the on-transition report is uniquely associated with a known device, then operations 305 set the on-off state of that known device to on. If the off-transition report is uniquely associated with a known device, then operations 306 set the on-off state of that known device to off. Then operations 307 update the time trace for the device. The time trace is running record of the times when on- and off-transitions occurred. It also contains the change in active power in the transition report associated with the transition. The time trace is used by other operations to compute and display information useful to the consumer.

If the off-transition report can be associated with more than one known device with is on-off state set to on, then the on-off state of all associated known devices are set to off. This means that reported power used by each known devise may be less than it actually used.

However, there is high confidence that the reported total power used for each known device was actually used by that device.

If the transition report can not be uniquely associated with a known device, then operations 308 update the time trace for the unknown devices. No further processing is necessary, so operations 309 are performed to prepare for the next interrupt and to allow Processor 122 to perform other unrelated function until the next interrupt occurs.

Device transition characterizations are determined by batch processing all of the recorded transition reports. These characterizations become more accurate and more comprehensive as more transition reports are processed. The number of known devices grows quickly during the first few weeks as multiple transitions reports for each device are recorded and processed.

Figure 4:
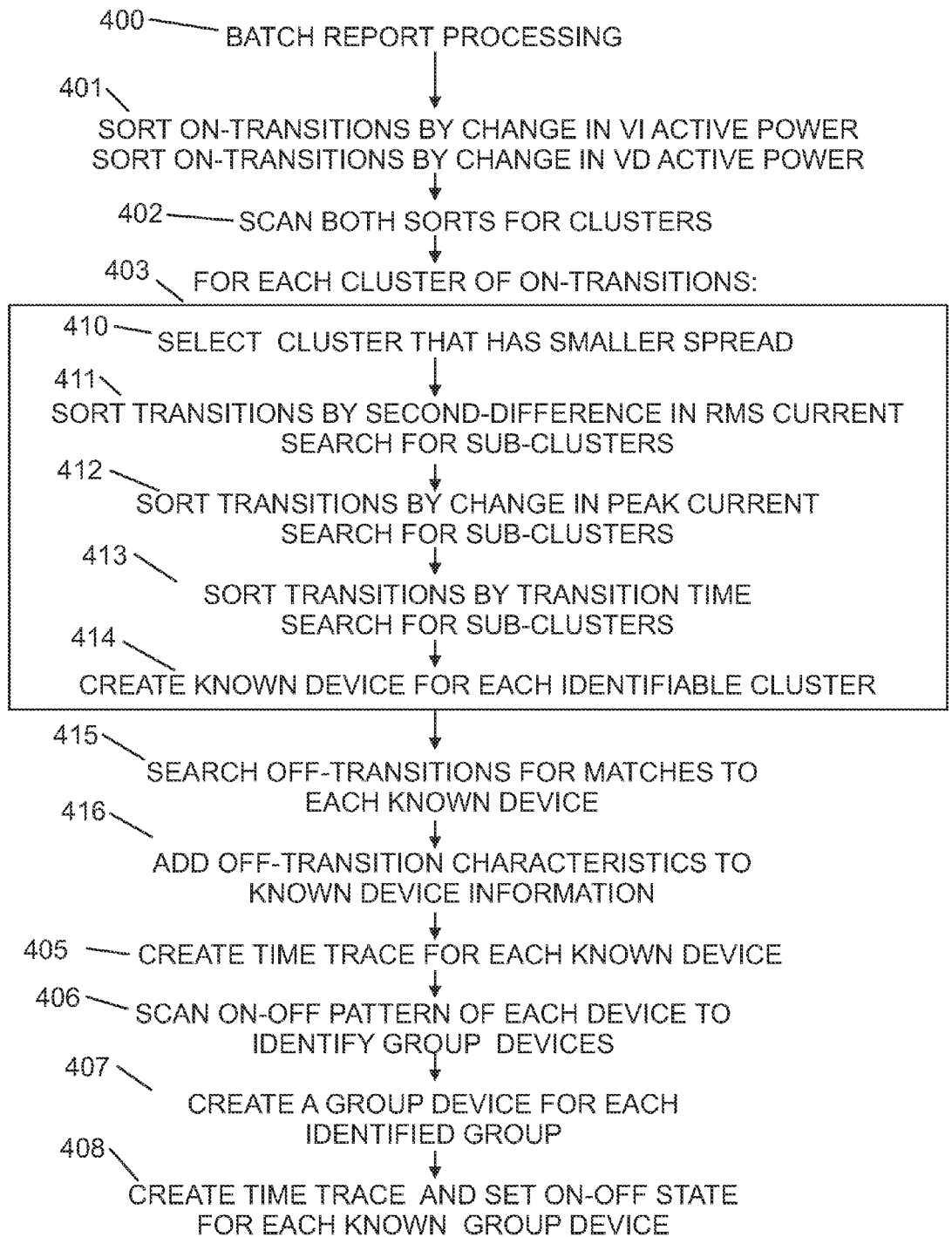
FIG. 4 is a flow diagram of the operations performed by Processor 122 to batch process transition reports to create known device characterization parameters.

FIG. 4 is a flow diagram of the operations performed by the batch report processing 400. Under control of Processor 122, this batch processing is typically performed once each day to ensure that the set of known devices is as large as possible and their characterization as accurate as possible. The consumer or some other external event may also initiate the batch report processing.

Operations 401 perform two sorts of all the on-transitions reports stored in data memory 123 based on the change in active power. The first sort assumes the change in active power is independent of the supply voltage (VI for voltage independent). The VI sort uses the change in active power as reported (the adjusted change in active power=transition parameter #9). The second sort assumes the change in active power depends linearly on the RMS voltage (transition parameter #8). Therefore the corrected change in active power for the voltage dependent (VD) sort is:

$$\text{corrected change in active power} = \frac{\text{transition parameter \#9} * \text{average } RSM \text{ voltage}}{\text{transition parameter \#8}}$$

where the average RMS voltage is the average of the RMS voltage from all of the regular reports.

Operations 402 scan both sorts for clusters. A variety of well know techniques can be used to identify the clusters. The preferred embodiment counts the number N of on-transitions between a change in active power range of P*(1−R) and P*(1+R) for each value of P between P-min and P-max where:

P is the change in active power in the on-transition report
R is a small value that specifies the range
P-min is the minimum detectable on-transition change in active power (determined by the transition thresholds, typically about 3 watts)
P-max is the largest change in active power found in the on-transition reports As an example, if R=0.02 then the power range is 2.4 watts to 3.6 watts for the smallest on-transition change in active power. The change in active power range is 3920 watts to 4080 watts the on-transitions associated with a typical air conditioner. A graph of N versus P will have many local maximums with a minimum between the local maximums. A cluster of on-transitions is associated with each maximum. All on-transitions with changes in active power between P*(1−2*R) and P*(1+2*R) are included in the cluster. It is possible that some on-transitions are in more than one cluster if the maximums are closely spaced. It is also possible that the clusters made using the voltage dependent sort are different from the clusters made using the voltage independent sort. A cluster is identified by VD (P, N) or VI (P, N) where:

VD is a voltage dependent cluster
VI is a voltage independent cluster
P is the change in active power value of the local maximum
N is the number of transitions in the cluster Operations inside box 403 are performed for each cluster in each sort of on-transition reports.

Operations 410 determine if the VD cluster or VI cluster has the smaller spread. A smaller spread is equivalent to a larger value of N. If N is the same for both clusters, then there is little variation in the supply voltage or the value of R is too large. If the clusters are closely spaced or if the voltage variations are large, it may be difficult to properly associate a VD cluster with its corresponding VI cluster based on the value of P. If there is ambiguity, they can be associated based on correlating the specific on-transition reports in each cluster.

It is possible that the number of VD clusters is different than the number of VI clusters. For example a single broad VD cluster may correspond to two narrow VI clusters. This can be determined by correlating the transition in each cluster.

After operations 410 are complete, there are collections of VD and VI clusters that provide the first level of device differentiation based on change in active power. Some on-transitions may belong to more than one cluster, so the sum of on-transitions in all the clusters may be greater than the number of on-transitions in data memory 123.

Operations 411 attempt to further differentiate the on-transitions in each cluster. Provided there are sufficient on-transitions, the on-transitions are sorted based on the maximum second-differences of RMS current. This sort is searched for multiple local maximums using methods similar to those described in the forgoing.

Operations 412 attempt to further differentiate the on-transitions using a sort based on the maximum change in peak current. This sort is searched for multiple local maximums using methods similar to those described in the forgoing.

Operations 413 attempt to further differentiate the on-transitions using a sort based on the time for the transition to complete. This sort is searched for multiple local maximums using methods similar to those described in the forgoing.

Operations 414 determine if the cluster can be divided into sub-clusters based on one or more of the additional differentiators. If the number of on-transitions in the cluster is relatively small, standard statistical methods may be used to differentiate random clustering from systematic clustering. Since it is possible that an on-transition is actually associated with a device represented by another cluster, an on-transition with a differentiator value significantly different from the others is removed from the cluster. If there is high statistical confidence that sub-clusters exist within the cluster then the on-transitions in the original cluster are redistributed to form two or more clusters.

For each identifiable cluster, a data structure is created that characterizes a corresponding known device. This data structure contains all the information associated with a known device including name, on-off state, characterization parameters, etc. Default names are assigned in sequence DEVICE #1, DEVICE #2, etc. The consumer can change the default name to correspond to the actual electrical device. The on-off state is binary, so it can be set to on or set to off.

The on-transition portion of the known device data structure contains the following on-transition characterization parameters:

1) Power versus voltage behavior—VI or VD
2) Change in active power; the difference in adjusted active power between before and after the transition of the center of the cluster (adjusted transition parameter #9)
3) Minimum change in active power—the smallest difference in adjusted active power between before and after the transition among all on-transition reports in the cluster (adjusted transition parameter #9)
4) Maximum change in active power—the largest difference in adjusted active power between before and after the transition among all on-transition reports in the cluster (adjusted transition parameter #9)
5) Minimum value of the maximum of second-differences of the RMS current among all on-transition reports in the cluster (transition parameter #2)
6) Maximum value of the maximum of second-differences of the RMS current among all on-transition reports in the cluster (transition parameter #2)
7) Minimum value of the maximum change in peak current during the transition among all on-transition reports in the cluster (transition parameter #1)
8) Maximum value of the maximum change in peak current during the transition among all on-transition reports in the cluster (transition parameter #1)
9) Minimum on-transition time among all on-transition reports in the cluster (transition parameter #4)
10) Maximum on-transition time among all on-transition reports in the cluster (transition parameter #4)

Operations 415 search the off-transition reports for off-transitions that can be associated with a known device. Off-transitions typically have fewer differentiating characteristics than on-transitions. The active power is the primary distinguishing characteristic of an off-transition. However, there can be an off-transition only if it was preceded by an on-transition for that device. Therefore an off-transition can only be associated with a known device with its on-off state set to on.

A device characteristic that can affect its off-transition parameters is its reactive impedance. Some of the energy stored in the device may be returned to the supply when the device is turned off. The change in the peak current and the second-difference in RMS current will be different for reactive loads compared to resistive loads. This differentiator is used if two or more devices in the on-state have active power characteristics that are not distinguishable.

Operations 415 sequentially process all the transition reports in data memory 123. When an on-transition report occurs, its transition parameters are compared to the on-transitions characterization parameters as determined by operations 414 for all known devices. If an unambiguous match is found, the on-off state of the device is set to on. When an off-transition report occurs, its change in active power is compared to the change in active power of all devices with their on-off state set to on. If only one device matches, then the off-transition report is associated with the corresponding known device, and the on-off state of the device is set to off.

If more than one device with is on-off state set to on can be associates with the off-transition report, then all associated on-off states are set to off, and the off-transition report is ignored. This ensures that only unambiguous off-transition reports become associated with their corresponding known device.

After all of the transitions reports are processed, the off-transitions associated with each known devices are processed to characterize the off-transition. The off-transition portion of the known device data structure contains the following off-transition characterization parameters:

1) Minimum value of the maximum of second-differences of the RMS current among all off-transition reports associated with the known device (transition parameter #2)
2) Maximum value of the maximum of second-differences of the RMS current among all off-transition reports associated with the known device (transition parameter #2)
3) Minimum value of the maximum change in peak current during the transition among all off-transition reports associated with the known device (transition parameter #1)
4) Maximum value of the maximum change in peak current during the transition among all off-transition reports associated with the known device (transition parameter #1)
5) Minimum on-transition time among all off-transition reports associated with the known device (transition parameter #4)
6) Maximum on-transition time among all off-transition reports associated with the known device (transition parameter #4)

If there is no off-transition associated with a known device, these parameters are set to zero. On-off cycles of the known device will still be properly recognized if no other known device with similar active power has its on-off flag set to on when the off-transition occurs.

Operations 405 process the all of the transition reports stored in data memory 123 to create an on-off trace for each known device. The time trace is a running record of the times when on- and off-transitions occurred and the change in active power (uncorrected transition parameter #9) associated with each transition.

Operations 406 scans the time traces of each device to find groups of devices that can be treated as a single device. Device B is determined to be a component of device A if all the transitions of device B happen when device A is on, and device B is never on when device A is off. Likewise device C is determined to be a component of device B if all the transitions of device C happen when device B is on, and device C is never on when B is off.

Operations 407 create a new group device for each group of devices that are determined to behave like a single device. This determination includes tests to differentiate devices that are controlled by an automatic process from independent devices that are often turned on at the same time by a consumer. Automatically controlled devices have consistent relative timing and durations. Therefore a group device is created only after multiple complete cycles have been measured and the relative timing of component devices verified. This group device is used for displaying and reporting the total power used by all the components of the device. The consumer interface enables manually creating, editing, and/or deleting group devices.

Operations 408 process all the reports in data memory 123 using the final known device characterization and group devices to produce time traces for each known device and to set its on-off state.

The on- and off-transition reports contain other parameters that are also useful in differentiating similar devices. Differences in the changes of reactive power (transition parameter #10), power factor (transition parameter #11), and the number of sign changes in the third-difference of the RMS current (transition parameter #3) may also be used as differentiators. These may be used in addition those used in operations 411, 412, and 413 or used as alternatives. The preferred embodiment should not be construed to be limitation on the number of parameters used to characterize transitions, or the choice of transition parameters used.

The information produced from the stored transition reports can be presented to the consumer in wide variety of ways. FIG. 5 is one example of a display produced on display 124. This display provides useful information to a consumer and the consumer can interact with the display to access other information. Those ordinarily skilled in the art of programming can easily utilize the information produced by the operations described in the foregoing to produce many other kinds of displays useful to consumers and others. This example should not be construed in any way to be a limitation of this invention.

The FIG. 5 display is updated when a known device makes an on- or off-transition. It is also updated periodically to provide the present values of the power, rate of cost, total time, and total cost for known devices. Totals are calculated for the period between the START DATE and the START TIME and the END DATE and END TIME. When the data entry device 125 is a touch screen on display 124, the consumer sets these values by touching the area that displays the value. This causes a calendar display or a clock display to appear. The consumer then touches the desired values. One choice for END DATE is "PRESENT". This causes the END DATE and END TIME to always be to the present date and time. After a value is selected, the FIG. 5 display shows the updated values.

After the consumer makes a change to a date or time value, Processor 122 accumulates the active power values in the regular reports stored in data memory 123 for the period specified by the start and end dates and times. If the END DATE is set to PRESENT, the accumulated active power is updated and displayed periodically. The TOTAL POWER (KWH) area of the display shows the total power in kilowatts used during the specified time period. The TOTAL $ area of the display shows the cost of the power used during the specified period.

The cost values are based on the rates charged by the utility. These rates could be updated directly by the utility using a communications protocol specified by the utility. Alternately the consumer could enter the rates specified on their utility bill using the touch screen. For example, touching the RATES area could produce a specific display for entering the rates charged by the utility. These rates may be complex, depending on the time of day and/or the total power used during the billing period. In the future, power rates may vary hourly based on the supply and demand. Since the regular reports contain the active power used each second, Processor 122 can compute the cost for any rate structure used by the utility.

The power measured by the utility and used for billing will almost certainly be different than the power reported by this invention. In addition to uncertainties in the start and end times for the billing period, typical variations in calibrations and nonlinearities can cause differences exceeding 10%. The reported value of TOTAL POWER (KWH) can be adjusted using a calibration factor CF such that:

$$\text{TOTAL POWER (KWH)} = CF * \text{regular report total power}$$

CF is computed by setting the START DATE and END DATE to match the billing period. The time of day when the meter is read is typically unknown, so the START TIME and END TIME are both set to the same arbitrary time. Then:

$$CF = \text{utility bill power/regular reported total power}$$

As an example, the consumer use dates on the utility bill to set the START DATE and END DATE. Then touching the TOTAL POWER (KWH) produces a specific display for entering the utility bill power. Processor 122 can then calculate CF and use it to scale the regular report total power so the displayed value of TOTAL POWER (KWH) is approximately the same as the utility bill power.

The PRESENT RATE (W) area of the display shows the active power presently being used. This is just the active power in the regular reports. The $/HR area displays the cost per hour at the present power and price rate.

Touching the IDENTIFY area enables the consumer to identify a specific known device or create a new known device. When IDENTIFY is touched, Processor 122 generates a display that instructs the consumer to turn on and turn off the specific device the consumer wants to identify. Processor 122 then processes the transitions and attempts to match the transitions with a known device. If the transitions match a know device, Processor 122 creates a display that enables the consumer to enter a new name for the identified device. The display shown in FIG. 6 can be used for this purpose. If the transitions can not be matched to a known device, then the transitions are characterized using the processes described in the foregoing, and a new known device is created. The consumer can then enter a name for this new known device.

Touching the GROUP area enables the consumer to create a new group device composed of multiple known devices. This makes it easier to track the energy used for specific purposes or activities or by specific consumers in the household. Processor 122 creates a display that enables the consumer to select multiple devices from among the known devices. After the selection is complete, the consumer provides a name for the group. Thereafter, the sum of the power and operating time of these known devices is calculated and displayed as a single device. In all displays, a group device name is visually distinguished from the name of simple device. This may be done by using different fonts and/or different colors for the names. For example, in FIG. 5, the CLOTHS DRYER is a group device which is displayed using a bold font.

The next display area shows information about the known and unknown devices. The headings describe the information available for each device. One way to make the display more useful is to enable the consumer to select how the devices are sorted for display. For example, touching the DEVICE area of the headings causes the devices to be sorted alphabetically by name. Touching any area a second time reverses the sort order. Touching any heading parameter causes the sort order to be determined by that parameter.

DEVICE is the name given to the known device. Initially, known devices are assigned default names sequentially. For example DEVICE #1, DEVICE #2, etc. A few devices such as an air conditioner, refrigerator, or washing machine can be automatically identified by the power and usage patterns. However, in general they can not. The consumer can manually identify a device and name it as described in the forgoing. An alternate method is described in the following.

There may be multiple electrical devices in the residence that behave nearly identically, so they are characterized as a single known device. Therefore an on-transition could occur while its on-off state is set to on. A counter is provided for each known device so the number of on devices of the same type can be tracked. This count is displayed in parentheses as suffix to the device name. For example, 60 WATT LIGHTS (2) as shown in FIG. 5 indicates two of these devices are on.

Touching the ON/OFF area causes all of the known devices that are on to be moved to the top of the display. Within the separate groups of on devices and off devices, the previous sort orders are preserved. The area for the information about an on device is differentiated from the area for an off device. In FIG. 5, on devices are underlined. With a color display, on device data might be displayed on a red background while off device data might be displayed on a green background.

For an on device, POWER (W) is the present real time value as determined by the active power difference after the on-transition. This value may be slightly different than its characterization change in active power. The value may also be adjusted while in the on state if a change in supply voltage is detected and the device has a voltage dependent power. A group device is likely to show different values at different times. If the device is off, the display shows its characterization change in active power.

For an on device, $/HR is the present cost of operating the device, including any adjustments for variable price rate. For an off device, the display is the average hourly operating cost during the period between the start and stop dates and times.

TOTAL TIME is the accumulated time the device has been on during the period between the start and stop dates and times. For group devices, time is accumulated when any of the component devices are on.

TOTAL $ is the accumulated cost of operating the device during the period between the start and stop dates and times. This includes all real time adjustments described in the foregoing. For group devices, the cost for each component device is calculated separately, then the added together to get the cost of the group device.

All active power and transitions that can not be assigned to a known device are assigned to the UNKNOWN device. In most homes there are devices that are on all of the time, or never generate sufficient transitions to be recognized. There are also cases where supply noise, device generated noise, or nearly simultaneous transition make it impossible to identify a particular transitions made by a known device. There are also some devices that do not produce consistent transitions. For example, an incandescent light controlled by a dimmer switch has variable transitions and a broad range of operating power.

The display for UNKNOWN always follows the headings. It is not affected by any of the sorts. The values displayed for UNKNOWN have slightly different interpretation than the values for known devices. The POWER (W) parameter is always the power presently consumed by all unknown devices. It is highly likely there is always some power that can not be associated with a known device. UNKNOWN is displayed as an on device unless the unidentified power is very nearly zero. The $/HR display is the present cost of operating all unknown devices.

The TOTAL TIME displayed for UNKNOWN is the elapsed time from the start date and time, or the elapsed time between the start and end time and date. In FIG. 5, the TOTAL TIME for UNKNOWN is 15 days, 19 hours, 12 minutes, and 14 seconds. The TOTAL $ display is the total cost of the operating all the unknown devices during this time period.

All of the known devices are listed below the UNKNOW device. It is very likely that the display is not large enough to show all known devices, so multiple pages are provided. Pressing GO TO NEXT PAGE produces a display with the heading GO TO PREVIOUS PAGE at the top and followed by a repeat of the header DEVICES ON/OFF . . . , etc. Below the header is the continuation of the sorted list of known devices. If additional displays are needed, then GO TO NEXT PAGE is displayed at the bottom.

Figure 6:
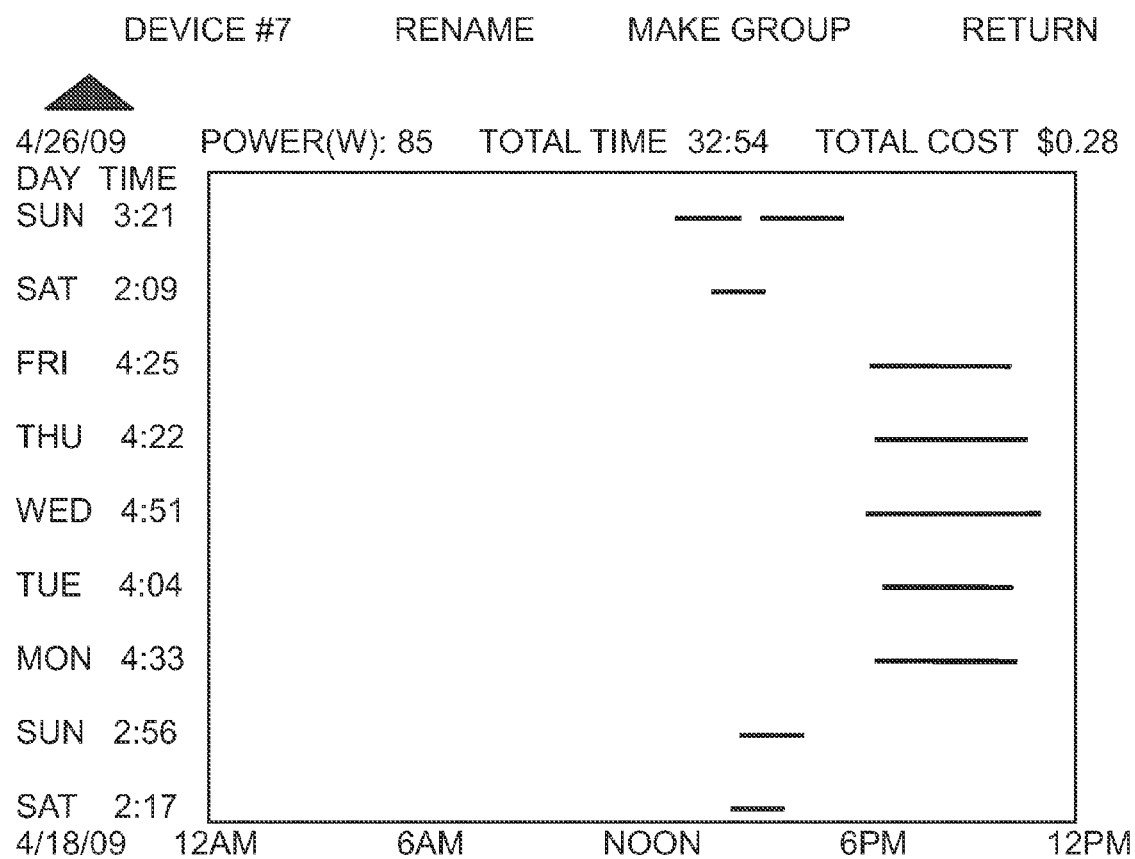
FIG. 6 is a typical display showing details of the power used by an electrical device over a period of days.

Additional useful information can be displayed for each known device. FIG. 6 is one example of such a display. Many other displays are possible and can be easily designed by those ordinarily skilled in the art of display graphics and human interface. This example should not be construed in any way to be a limitation of this invention.

FIG. 6 uses a calendar-like display to show the operation history of specific devices. Processor 122 generates the display when the consumer touches an area associated with a specific device in the display shown in FIG. 5. For the FIG.6 example, the device selected is DEVICE #7. The FIG. 6 example displays nine days of operation, beginning Apr. 18, 2009 and ending Apr. 26, 2009. The dates can be changed by touching the up-pointing arrow or the down-pointing arrow. In this example, the period is fixed to be nine days with operating details for each day.

Similar displays can be easily produced to show weekly or monthly patterns. For a weekly display, the bottom line might be the day of the week and the bars replaced by text representing the on-time for each day. Alternately, a bar graph could be displayed. The horizontal axis would show days, and the height of the bar would be proportional to the total on-time or cost for that day. A time period of several months could be displayed using such a graph.

In FIG. 5, the column on the left shows the day of week followed by the time (hours:minutes) that the device was on for that day. The bottom line of the display shows the time of day. For each day, a horizontal bar corresponds to when the device was on. The total length of the bar is proportional to the total time for that day. Each on period during the day is shown as a separate bar. For example, Apr. 26, 2009 (SUN) shows two on periods during the afternoon.

POWER(W) is the average power used by the device (total power/total time) during the display period. TOTAL TIME is the total time the device was on during the display period. TOTAL COST is the cost of operating the device during the display period. This includes rate adjustments and supply voltage adjustments that were applied in real time.

If the displayed device is a group device then separate adjacent bars are shown for each device in the group. The values of POWER(W), TOTAL TIME, and TOTAL cost are calculated as described in the foregoing.

Touching the RENAME area enables the consumer to enter a new name for the device. With a touch screen, a keyboard display is shown and the consumer touches the letters sequentially to spell the name.

Touching the MAKE GROUP area enables the consumer to make a new group that contains the displayed known device. If the displayed device is a group device, then the MAKE GROUP area is replaced with EDIT GROUP. Touching this area enables the consumer to add or remove known devices from the group.

Touching the RETURN area causes the display shown in FIG. 5 to be generated.

Figure 7:
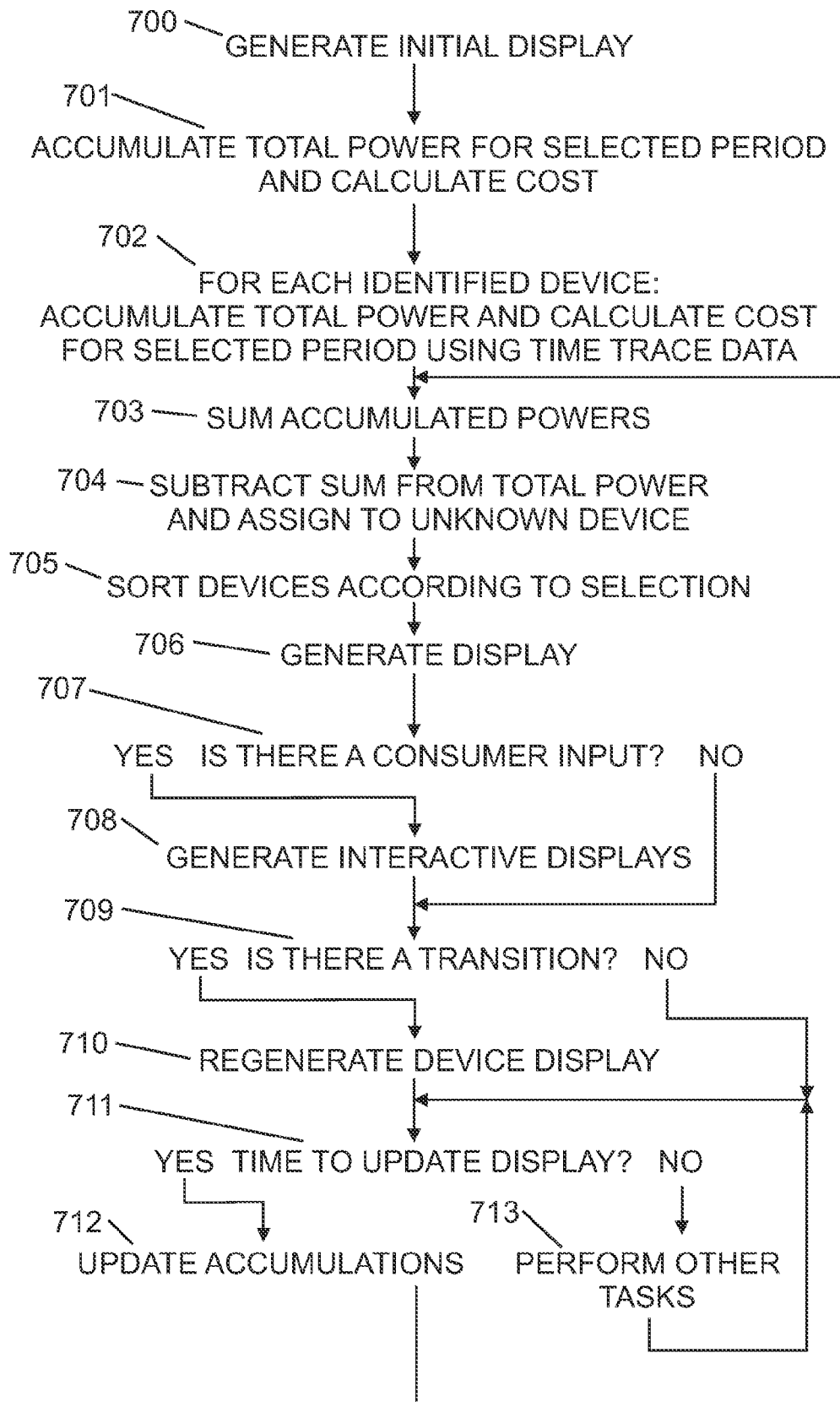
FIG. 7 is a flow diagram of the operations performed by Processor 122 to produce displays showing power use.

FIG. 7 is shows the operations that generate the display shown in FIG. 5. In some applications, Processor 122 may perform many tasks and create displays that are not related to power monitoring. The power monitoring function might be one of many display windows on a personal computer, or might be one of several functions provided by an energy management system. The operations shown in FIG. 7 only operate when a display such as FIG. 5 or FIG. 6 is active.

If the consumer can deactivate the display using a touch screen, the display in FIG. 5 includes an area labeled RETURN at the right of the last display line that shows GO TO NEXT PAGE. When the consumer touches the RETURN area, the operations shown in FIG. 7 are suspended and the display is used for other functions.

Operation 700 is the entry point to the display generating operations. Operations 701 process the regular reports stored in data memory 123 for the time period between the starting date and time and the ending date and time. The active power from each report is accumulated to calculate the total power while the appropriate rates are applied to calculate the accumulated cost.

Operations 702 use the time traces maintained for each known device to accumulate the total power used during the selected time period and to accumulate the corresponding total costs. The average value of the change in active power associated with the on-transition and the off-transition of each on-off cycle is used when accumulating the total power and total cost. These values are stored in the time trace by operations 307 and 405 previously described.

Operations 703 sum the total power for all known devices. Operations 704 subtract this total from the total active power calculated by operations 701. The difference in active power is assigned to the UNKNOWN device. This represents all the active power that can not be assigned to known devices.

Operations 705 sort the known devices according to the properties described in the forgoing. The default sort is based on the total cost of operating each device (TOTAL $). Operations 706 then generate the display of FIG. 5 using the most recent values.

Operations 707 test for the consumer touching a sensitive area of the display (or providing other input) such as described in the foregoing. Based on the specific consumer input, operations 708 generate the appropriate new display.

Operations 709 test for an on- or off-transition that changes the on-off state of one of the known devices. When the on-off state is changed, operations 710 update the display to show the new state of the affected known device.

The display is updated regularly. In the preferred embodiment, this is after every fifth regular report is received or about once every 5 seconds. Operations 711 and 713 create a loop that regularly tests if it is time to update the display. If it is not yet time, Processor 122 can perform some other tasks 713. This waiting function may also be implemented as an interrupt included with the operations shown in FIG. 3. As regular reports are received, operations 302 can maintain a count and transfer flow to operations 712 after every fifth regular report is received.

The forgoing describes measuring and storing more parameters than needed to provide the described functions. A variety of additional useful information can be extracted from the stored information. As one example, it is well known that the electrical characteristic of electric motors change as they wear. Likewise the power needed by mechanical equipment driven by motors also changes over time. For example, the power consumed by an air conditioner can depend on its refrigerant charge, condition of its compressor, and the airflow through is two heat exchangers. However, other factors such as the outside temperature and the time of continuous operation can also affect the power. After adjusting for these affects, long term changes in the power measured by the on- and off-transitions can be attributed to physical changes in the air conditioner. Since most of these changes reduce efficiency, early detection and maintenance or repair can prevent significant wasted energy.

As another example, the power distribution circuits within a home have multiple splices and connection that may deteriorate over time, increasing the resistance in the electrical path supplying power to devices. This resistance can make the connection get hot under high load and cause a fire. This problem can be detected in some cases if two or more devices receive power through the same connection and there are transitions when each device operates individually and together. If the first device is on, the voltage available to second device is reduced, so its transitions parameters will depend on the on-off state of the first device. Searching for correlated changes in the on-transitions and off-transitions can is some cases identify a faulty connection in a distribution circuit in the home.

As another example, a high power device will reduce the supply voltage which is measured directly. This voltage drop can be used to determine the resistance of the electrical service to the home. Difference in resistance between the two legs and/or changes over time can alert the homeowner to potential problem with the electrical service before it fails or causes a fire.

The forgoing examples are only illustrative of the information than may be extracted from information stored in data memory 123, and correlating the data with other events and conditions.

Conclusion

From the forgoing description, it will be apparent that there has been provided an improved power monitoring system that uses only one set of current and voltage sensors to identify individual electrical devices served by a common AC supply. The invention also tracks the power usage of each known device and reports to the consumer the present status of the known devices, and the accumulated run time and cost for a specified period of time for each known device.

The various features illustrated in the figures may be combined in many ways, and should not be interpreted as though limited to the specific embodiments in which they were explained and shown. Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method comprising:
receiving a set of transition reports, each transition report of the set of transition reports corresponding to a different respective transition each of a respective electrical device of a plurality of electrical devices between an off state and an on state, each transition report including a plurality of transition parameters characterizing a respective condition of a common alternating current service for variously powering each of the plurality of electrical devices, wherein each of the plurality of transition parameters of the set of transition reports includes a change in active power parameter value;
with a processor, identifying from the set of transition reports a cluster of on-transition reports, each on-transition report of the cluster describing a transition of a respective one of the plurality of electrical devices to an on state, the identifying the cluster including:
for each active power value of a plurality of active power values, determining a respective count of a number of the change in active power parameter values of the set of transition reports which are within an active power range for the active power value; and
identifying a local maximum of the respective counts as being associated with the cluster;
based on the identified cluster, creating in a memory device a data structure characterizing a first device of the plurality of electrical devices, said data structure comprising a plurality of on-transition characterization parameters, wherein values of said on-transition characterization parameters are determined based on transition parameters of the cluster of on-transition reports;
identifying one of the set of transition reports as being an off-transition report associated with the first device;
based on the identified off-transition report, determining one or more values for a plurality of off-transition characterization parameters of the data structure; and
providing the data structure for an automatic determining of whether a first transition report subsequent to the set of transition reports corresponds to the first device.

2. The method of claim 1, wherein determining whether the first transition report corresponds to the first device includes one of:
identifying an on state for the given device based on a comparison of transition parameters of the first transition report with on-transition characterization parameter values in the data structure; and
identifying an off state for the given device based on a comparison of transition parameters of the first transition report with off-transition characterization parameter values in the data structure.

3. The method of claim 1, further comprising:
creating a time trace for the first device, said time trace comprising the time of occurrence of each said transition report corresponding to the first device, wherein said time trace comprises a representation of a history of an on-off state of the first device.

4. The method of claim 1, further comprising:
displaying to a user a representation of the first device and a representation of an on-off state of the first device.

5. The method of claim 1, further comprising:
determining based on the data structure a power use by the first device during an on state of the first device; and
displaying to a user a representation of the first device and a representation of the determined power use by first device during the on state of the first device.

6. The method of claim 5, further comprising:
creating a time trace for the first device, said time trace comprising a respective time of occurrence of each one of multiple transition reports corresponding to the first device;
wherein the determining the power use by the first device based on the data structure includes determining the power use based on the time trace.

7. The method of claim 6, further comprising:
generating a trace display for the user, said trace display comprising a representation of the first device and a representation of the time trace.

8. The method of claim 1, further comprising processing a set of electrical parameters repeatedly at a frequency of substantially 60 Hz, each processing of the set of electrical parameters to generate a respective one of the set of transition reports.

9. The method of claim 1, wherein the set of transition reports each include a second-difference current parameter value.

10. The method of claim 1, wherein the set of transition reports each include a third-difference current parameter value.

11. The method of claim 1, the identifying the cluster further comprising:

based on the identifying the local maximum, sorting a subset of the transition reports; and searching for a sub-cluster within the sorted subset of the transition reports.

12. A device comprising:

sensors to produce signals representative of conditions of a common alternating current service for variously powering each of the plurality of electrical devices;

an analog-to-digital conversion circuit to sample and to measure said signals;

a digital processing circuit to process the sampled signals to produce a plurality of electrical parameter values;

a preprocessing circuit to generate based on the plurality of electrical parameter values a set of transition reports, each transition report of the set of transition reports corresponding to a different respective transition each of a respective electrical device of a plurality of electrical devices between an off state and an on state, each transition report including a plurality of transition parameters characterizing a respective condition of a common alternating current service for variously powering each of the plurality of electrical devices, wherein each of the plurality of transition parameters of the set of transition reports includes a change in active power value;

a data memory to store said set of transition reports; and a processing circuit to:

identify from the set of transition reports a cluster of on-transition reports, each on-transition report of the cluster describing a transition of a respective one of the plurality of electrical devices to an on state, the processing circuit to identify the cluster including:

for each active power value of a plurality of active power values, the processing circuit to determine a respective count of a number of the change in active power parameter values of the set of transition reports which are within an active power range for the active power value; and the processing circuit to identify a local maximum of the respective counts as being associated with the cluster;

create, based on the identified cluster, a data structure characterizing a first device of the plurality of electrical devices, said data structure comprising a plurality of on-transition characterization parameters, wherein values of said on-transition characterization parameters are determined based on transition parameters of the cluster of on-transition reports;

identify one of the set of transition reports as being an off-transition report associated with the first device;

determine, based on the identified off-transition report, one or more values for a plurality of off-transition characterization parameters of the data structure; and provide the data structure for an automatic determining of whether a first transition report subsequent to the set of transition reports corresponds to the first device.

13. The method of claim 1, wherein the transition reports are generated based on a processing of electrical parameters which is performed approximately once per alternating current cycle of the common alternating current service.

14. The device of claim 12, wherein the pre-processing circuit to generate the set of transition reports includes the pre-processing circuit to process electrical parameters approximately once per alternating current cycle of the common alternating current service.

* * * * *